E. P. McLANE.
Machine for Tapping Nuts.

No. 227,558. Patented May 11, 1880.

2 Sheets—Sheet 1.

Witnesses:

Inventor:

E. P. McLANE.
Machine for Tapping Nuts.
No. 227,558. Patented May 11, 1880.
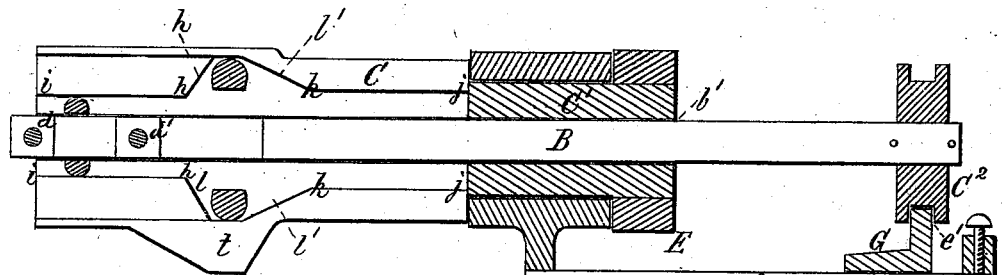
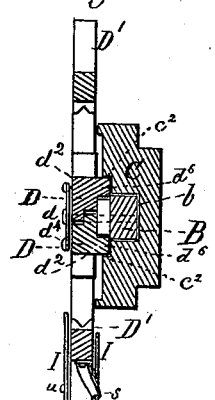
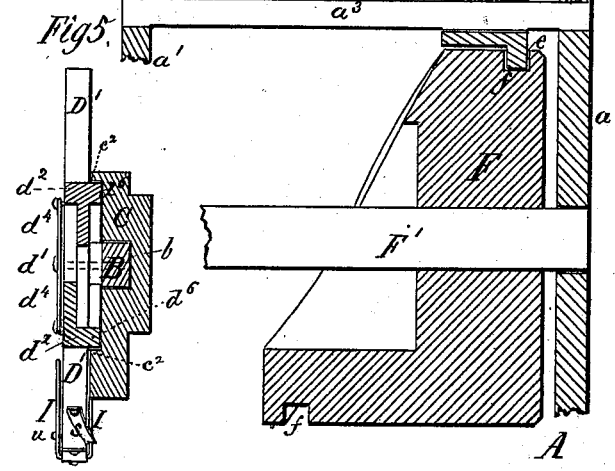
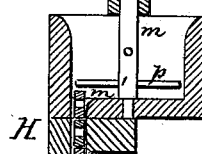
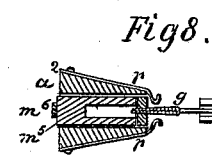
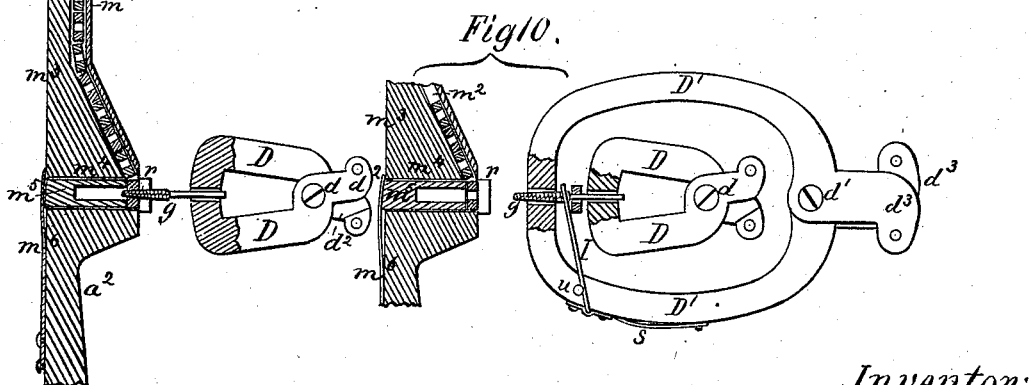
Witnesses:
J. P. Th. Lang.
S. Russell Bartt
Inventor:
Edwin P. McLane
by
Mason, Fenwick & Lawrence

UNITED STATES PATENT OFFICE.

EDWIN P. McLANE, OF MOUNT CARMEL, CONNECTICUT.

MACHINE FOR TAPPING NUTS.

SPECIFICATION forming part of Letters Patent No. 227,558, dated May 11, 1880.

Application filed February 12, 1880.

*To all whom it may concern:*

Be it known that I, EDWIN P. McLANE, a citizen of the United States, residing at Mount Carmel, in the county of New Haven and State of Connecticut, have invented a new and useful Machine for Tapping Nuts, of which the following is a specification.

My invention relates to improvements in nut-tapping machines in which a tap is revolved, and while revolving is caused to reciprocate longitudinally; and the objects of my improvements are, first, to provide two pairs of jaws for operating the tap; second, to provide spring-stops in the tapping-channel of the hopper for preventing the nuts falling out before they are tapped, and then allowing them to pass out with the tap after they are tapped; third, to provide a stripper, in combination with the two pairs of jaws, for stripping the nut from the tap and discharging it at the rear end of the same.

I attain these objects by the mechanism illustrated in the accompanying drawings, in which—

Figure 1:
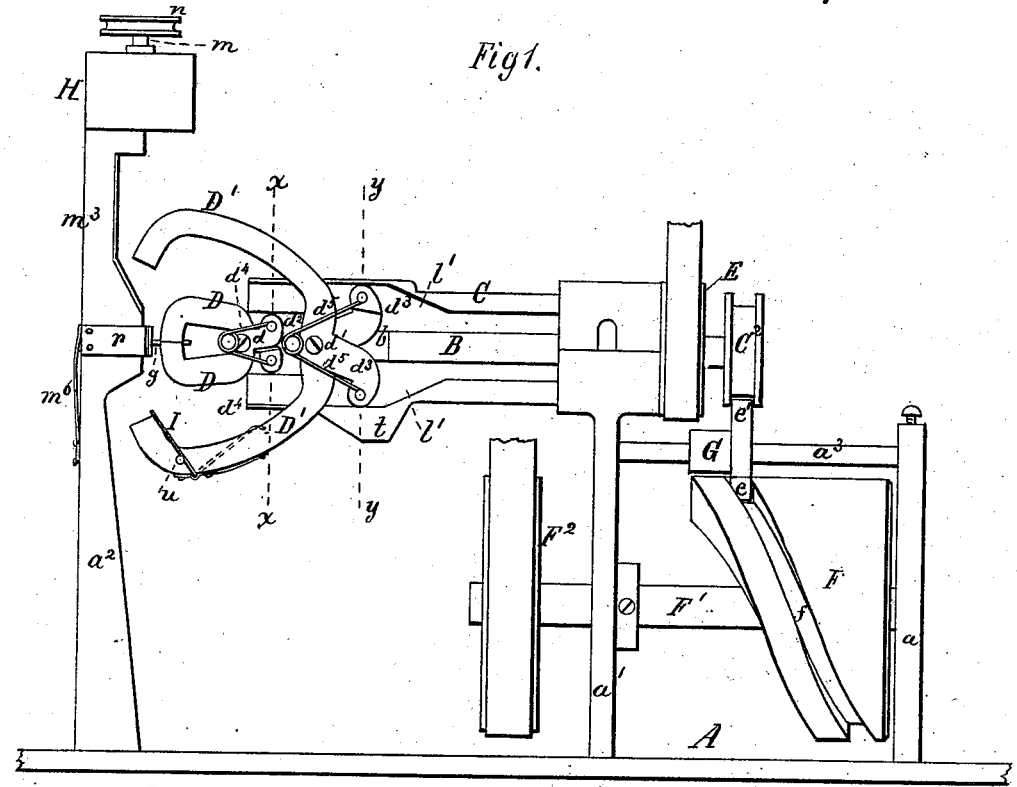
Figure 2:
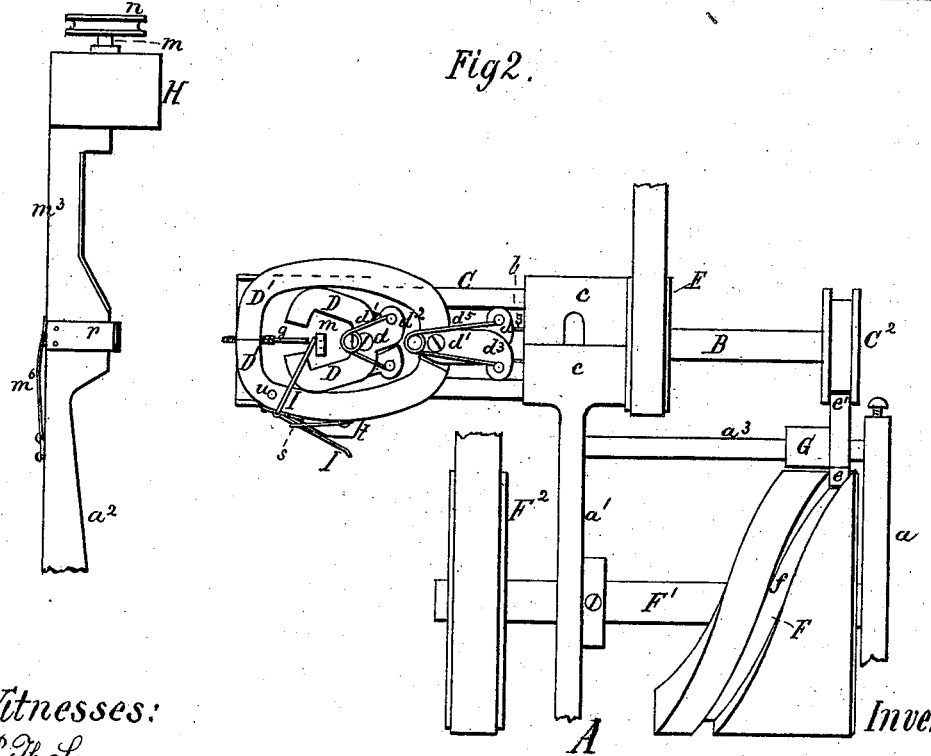

Figure 1 is a side elevation of the entire machine as it appears while the tap is in a nut which has just been tapped and before the nut and tap are started backward. Fig. 2 is a side elevation of nearly the entire machine as it appears after it has moved the tapped nut backward and stripped it from the tap. Fig. 3 is a broken vertical section of a portion of the machine. Fig. 4 is a detail vertical section in the line $x\ x$ of Fig. 1. Fig. 5 is a detail vertical section in the line $y\ y$ of Fig. 1. Fig. 6 is a detail vertical section of the hopper and its tapping adjuncts, showing the tap and the rear pair of jaws. Fig. 7 is a front-end view of the jaws shown in Fig. 6, the tap being in them. Fig. 8 is a horizontal detail section of hopper, channel, and other adjuncts of the hopper, and also of the rear pair of jaws as they appear when the tap is partly through the nut. Fig. 9 is a similar section to Fig. 8, showing the tapped nut, the tap, and rear pair of jaws as moved partly backward. Fig. 10 is a broken vertical section and partial elevation, showing the front pair of jaws grasping the body portion of the tap and the rear pair of jaws ready for leaving the shank portion of same.

Similar letters refer to similar parts throughout all the views.

The frame A may be of any suitable construction, and upon its three uprights, $a\ a'\ a^2$, and tie-bar $a^3$ the several parts of the machine are applied.

B is a longitudinal flat-sided bar, fitted loosely in a groove, $b$, of a cam-plate, C. The cam-plate is connected to a revolving head, C', which is fitted loosely in a bearing-box, $c$, on top of the standard $a'$ of the frame A. The head C' has a passage, $b'$, having flat sides, extending through it from end to end, and through this passage the rear portion of the bar B is passed.

On the front end of the bar two pair of jaws, D D', are pivoted, as shown at $d\ d'$, and on the rear end of the bar a grooved collar, $C^2$, is keyed or pinned fast.

E is a pulley keyed upon the rear end of the head C', and a driving-band is placed upon this pulley, and by this means the pulley, together with the head C' and the cam-plate carrying the jaws D D', can be revolved.

The bar B is connected to a grooved cam, F, on a driving-shaft, F', by means of a traveling slide, G, said slide having a pin, $e$, for traveling in the cam-groove $f$, and an extension, $e'$, of a form to fit the smaller periphery of the grooved collar $C^2$, as shown.

On the shaft F' a driving-pulley, $F^2$, for revolving the cam F, and thereby causing the slide G to reciprocate the bar carrying the jaws D D', is keyed fast, and around this pulley a band is to be passed. The cam-groove $f$ extends entirely around the cam F, and when the cam has made a half-revolution, as shown in Fig. 1, the slide-bar B will have completed its forward movement, and by continuing to revolve the cam the said bar begins its back movement, and when the cam stands as shown in Fig. 2 the bar B will have completed its back movement. While the bar B and all the parts attached to it are caused to reciprocate by the cam F, said bar, its attached parts, and the cam-plate C are caused to revolve by means of a band on the pulley E.

The jaws D D are arranged within the jaws D' D', and the respective pairs of jaws have each extension lever-arms $d^2\ d^3$, which cross one another, as shown. To the front side of the arms $d^2$ a spring, $d^4$, is fastened, and in like manner a spring, $d^5$, is fastened to the arms $d^3$. The springs $d^4$ and $d^5$ are respectively for opening the respective pairs of jaws when they are free from the cam-ledges of the cam-plate C.

On the face of the cam-plate C ledges $c^2$ are formed, and between these ledges the laterally-projecting lugs $d^6$ of the two pairs of jaws extend, as shown in Figs. 4 and 5 of the drawings. The channel-way formed between the ledges is just wide enough along two portions of its length—to wit, from $h$ to $i$ and from $j$ to $k$—to prevent the jaws D and D' from opening or ceasing to gripe the tap $g$. Between the points $k$ and $h$ the channel-way formed by the ledges is widened sufficiently to permit the jaws D and D' to open and cease their gripe upon the tap $g$. This widened portion of the channel-way is made with an acute incline, $l$, and an obtuse incline, $l'$, on opposite sides, as shown in the drawings. The inclines $l$ serve for closing the jaws D, and the inclines $l'$ the jaws D', while the spaces between these inclines afford room for both pair of jaws to be opened when their lever-arms pass the points $h$ and $k$.

The jaws D open when the slide B moves backward and close when the slide moves forward, and the jaws D' open when the slide B moves forward and close when the slide moves backward. Thus one pair of jaws takes hold of the tap at its shank end on the forward movement and the other pair takes hold of it at its body portion on the back movement, this opening and closing of the jaws being timed and controlled by the inclines and the cam-groove $f$, as the circumstances of the case may require; but care must be had that the jaws D shall not cease their gripe on the shank of the tap until the jaws D' have taken a firm hold upon its body, and vice versa.

H is a nut-feeding hopper, provided with a vertical shaft, $m$, having a pulley, $n$, on its upper end and stirring-arms $p$ near its lower end. The bottom of the hopper has a narrow flaring aperture, $m'$, through it, and this aperture connects with a long narrow chute or channel, $m^2$, of an extension, $m^3$, formed on or attached to the standard $a^2$ of the frame. The channel or chute is straight up and down for a portion of its length, and inclined for the remainder thereof. The inclined portion of the channel is intersected horizontally by a long passage, $m^4$, in which a tubular slide-block, $m^5$, is fitted, as shown. This slide-block is not quite as long as the passage $m^4$, it being just about the thickness of the nuts being tapped shorter than said passage. Against the solid end of this block a spring, $m^6$, bears, and, while serving to keep the block in place, this spring allows the block a chance to yield in case the tap should be endangered by too great resistance against it. This spring also prevents the thinning or stripping of the thread in the nuts in case the cam should carry the tap forward a little too fast, from imperfect construction or other cause. The spring by yielding accommodates any variation from a uniform length of movement by the cam.

On the inner side of the extension $m^3$ two spring-jaws, $r$, are provided for closing, in part, the entrance to the passage $m^4$. These springs are bent or curved so as to offer but slight obstruction to the entrance of the tap and the passage back of the same with the nut on it. The office of these springs is to prevent the nuts from falling out as they descend from the hopper to a position behind the slide-block, as shown in the drawings, and still not prevent the tapped nut being drawn out with the tap.

In order to discharge the tapped nut from the tap as the tap is drawn backward, a spring-lever, I, of angular form, is pivoted to the lower jaw, D', of one of the pairs of jaws, and one arm of this lever is caused to vibrate backward and forward. The forward movement of the lever is caused by a spring, $s$, attached to the same jaw, and the backward movement is caused by the arm of the lever being depressed by an inclined projection, $t$, on the under side of the cam-plate C.

The cam-projection $t$ is so situated that it operates upon the arm of the lever I at the time when the tapped nut has been carried back on the tap, the jaws D' D' have griped the body portion of the tap, and the jaws D D have moved apart, and have ceased their gripe upon the shank of the tap. The stop-pin $u$ arrests the lever I when freed from projection $t$.

It will be understood that as the tap revolves much faster than the cam F the pitch of the cam-groove must be greater than the pitch of the thread being tapped in the nuts.

The operation is as follows: Power is applied to the head C' by belt on pulley E and to the cam-shaft F and shaft $m$ by belts applied on the pulleys F² and $n$. The grooved cam carries the flat-sided shaft B forward just fast enough to agree with the thread on the tap. The nuts are put in the hopper, and being moved about by the arms $p$ fall into the flaring opening in the bottom of the hopper and pass down in front of the tap. The tap, in its advance, as above described, taps the nut, and in receding the tap draws the nut along with it. At the proper moment the jaws D D open and the jaws D' D' close, the latter closing first and taking hold of the tap forward of the nut, and the former then opening. At this stage the stripping-lever I forces the nut backward over the shank of the tap. The slide B, on again advancing, causes the jaws D D to take hold of the shank of the tap and the jaws D' D' to open, and thus the operation proceeds.

What I claim as my invention, and desire to secure by Letters Patent, is—

1. In combination with the stationary nut-holder, the reciprocating jaws D and D', substantially as and for the purpose described.

2. The combination of the stripping-lever I and jaws D and D', whereby the nuts are removed over the shank end of the tap, substantially as and for the purpose described.

3. The combination of the spring-jaws r and the jaws D and D', substantially as and for the purpose described.

4. In a nut-tapping machine, in combination with the two pairs of jaws D D', mechanism for causing one pair of said jaws to grasp the tapping-tool by its shank during its feed forward, and the other pair to grasp it forward of its shank during its feed backward, substantially as described.

EDWIN P. McLANE.

Witnesses:
GEORGE S. THORPE,
ELLSWORTH B. COOPER.